United States Patent [19]
Nelson et al.

[11] Patent Number: 5,838,881
[45] Date of Patent: Nov. 17, 1998

[54] SYSTEM AND METHOD FOR MITIGATION OF STREAMING ELECTRIFICATION IN POWER TRANSFORMERS BY INTELLIGENT COOLING SYSTEM CONTROL

[75] Inventors: John Keith Nelson, Niskayuna; John Arthur Palmer, Troy, both of N.Y.

[73] Assignee: Electric Power Research Institute, Inc., Palo Alto, Calif.

[21] Appl. No.: 502,829

[22] Filed: Jul. 14, 1995

[51] Int. Cl.⁶ ...................................................... G06F 15/18
[52] U.S. Cl. .............................. 395/22; 165/293; 395/11; 395/3
[58] Field of Search ..................... 395/22, 3, 11, 395/51; 364/164; 62/183, 259.2; 165/1, 293

[56] References Cited

U.S. PATENT DOCUMENTS

| | | | |
|---|---|---|---|
| 4,238,931 | 12/1980 | Campbell | 62/183 |
| 4,512,387 | 4/1985 | Rodriguez et al. | 165/1 |
| 4,947,468 | 8/1990 | Nelson | 324/453 |
| 5,459,816 | 10/1995 | Basehore et al. | 395/3 |
| 5,559,690 | 9/1996 | Keeler et al. | 364/164 |
| 5,579,439 | 11/1996 | Khan | 395/11 |
| 5,594,835 | 1/1997 | Rahman et al. | 395/51 |

OTHER PUBLICATIONS

E. Cox, "Fuzzy Fundamentals", *IEEE Spectrum*, Oct. 1992, pp. 58–61.

G.A. Cordes, H.B. Smartt, J.A. Johnson, D.E. Clark, K.L. Wickham, "Design and Testing of a Fuzzy Logic/Neural Network Hybrid Controller for Three–pump Liquid Level/Temperature Control", *1993 IEEE International Conference on Fuzzy Systems*, pp. 167–171.

M.M. Gupta and J. Qi, "Fusion of Fuzzy Logic and Neural Networks with Applications to Decision and Control Problems", *Proceedings of the American Control Conference*, vol. 1, pp. 30–31, 1991.

A. Patrikar and J. Provence, "Control of Dynamic Systems Using Fuzzy Logic and Neural Networks", *International Journal of Intelligent Systems*, vol. 8, pp. 727–748, 1993.

D.W. Crofts, "The Static Electrification Phenomena in Power Transformers", *IEEE Transactions on Electrical Insulation*, vol. 23, No. 1, pp. 137–146, 1988.

H.R. Moore, "Inspection of Transformer at Palo Verde Nuclear Plant, Arizona Public Service Comapany", Third EPRI Workshop, *Static Electrification in Power Transformers*, San Jose, California, Jan. 23–24, 1992.

M. Ieda, T. Yanari, T. Miyamoto and M. Higaki, "Investigation of Static Electrification in Large Power Transformers in Japan", EPRI Mini–workshop, *Static Electrification in Power Transformers*, Muncie, Indiana, Feb. 18–19, 1993.

M.E. Furey, J.A. Palmer and J.K. Nelson, "A New Reciprocating Apparatus for the Measurement of Electrostatic Charging Tendency of Transformer Oil", Fourth EPRI Workshop, *Static Electrification in Power Transformers*, Milwaukee, Wisconsin, Sep. 28–30, 1994.

J.K. Nelson and M.J. Lee, "Tandem–Chamber Charge Density Monitor", *IEEE Transactions on Electrical Insulation*, vol. 25, No. 2, Apr. 1990.

(List continued on next page.)

*Primary Examiner*—Allen R. MacDonald
*Assistant Examiner*—Sanjiv Shah
*Attorney, Agent, or Firm*—Leonard Bloom

[57] ABSTRACT

An intelligent controller for on-line monitoring of circulation system in order to minimize a problem of streaming electrification and to avoid degradation of the electrical insulation of the system. The controller is designed to combine advantages of fuzzy logic and neural networks, and includes a fuzzy logic (employing a pseudo-neural network) for acquiring analog input data from a plurality of sensors and for interpreting this input data into fuzzyfier outputs. A main processor consisting of a fully connected feed-forward neural network serves for processing the fuzzifier outputs in order to obtain controlling instructions for the system.

28 Claims, 10 Drawing Sheets

OTHER PUBLICATIONS

C. Krause, E. Knoll, R. Stonitsch and J. Alff, "Measurements showing the enhancement of Electrostatic Charging by AC–Voltage in a Duct Model and a Full–Scale Power Transformer", Fourth EPRI Workshop, *Static Electrification in Power Transformers*, Milwaukee, Wisconsin, Sep. 28–30, 1994.

A.J. Morin, J.R. Melcher and M. Zahn, "An Absolute Charge Sensor for Fluid Electrification Measurements", Conference Record, *1988 IEEE Symposium on Electrical Insulation*, Jun. 5–8, 1988, pp. 18–22.

M.A. Brubaker and J.K. Nelson, "A Full–Scale Simulation of Streaming Electrification in a Large Core–Form Transformer Winding", Fourth EPRI Workshop, *Static Electrification in Power Transformers*, Milwaukee, Wisconsin, Sep. 28–30, 1994.

J.A. Palmer and J.K. Nelson, "Streaming Electrification Dynamics in Oil/Cellulose Systems", *Conference on Electrical Insulation and Dielectric Phenomena*, Arlington, Texas, Oct. 23–26, 1994.

J.H. Ugo and H.R. Moore, "Static Electrification in a 700 MVA 23.7/345 kV Generator Step Up Transformer", Fourth EPRI Workshop, *Static Electrification in Power Transformers*, Milwaukee, Wisconsin, Sep. 28–30, 1994.

D.W. Crofts and H.R. Moore, "Static Electrification Testing of Texas Utilities 345–20.9 kV 650 MVA Generator Step–up Transformer under Controlled Factory Conditions", Fourth EPRI Workshop, *Static Electrification in Power Transformers*, Milwaukee, Wisconsin, Sep. 28–30, 1994.

SYSTEM AND METHOD FOR MITIGATION OF STREAMING ELECTRIFICATION IN POWER TRANSFORMERS BY INTELLIGENT COOLING SYSTEM CONTROL

FIELD OF THE INVENTION

The present invention relates to intelligent controllers, and more particularly, to controllers taking elements of fuzzy logic and neural networks for controlling cooling systems of large power transformers in order to limit the problem of streaming electrification.

BACKGROUND OF THE INVENTION

In the prior art, it is well known that an electrostatic charge builds up in oil and other coolants circulating through power transformers and other electrical power systems, thereby causing a serious problem referred to as "streaming electrification". For example, 30 streaming electrification incidents have occurred in the past 15–20 years, and some of these incidents were catastrophic failures which included the complete destruction of the transformers and some related peripheral equipment.

The problem of streaming electrification in cooling systems of large power transformers has been studied in an effort to characterize this complex phenomena and on the basis of understanding the phenomenon to provide preventive measures.

As the result of studies conducted, it has been observed that the generation of charge is roughly proportional to the flow rate of the coolant circulating through the transformer. The temperature of the transformer oil also plays a key role, resulting in a temperature peak in the charging characteristic. Furthermore, the potentials reached due to charge build up in a transformer is most serious at lower temperatures when the resistivity of the solid insulation is the highest.

The distribution of moisture within the solid insulation also affects the influence of streaming electrification on the transformer. Due to differences in the relative moisture absorption rates of cellulose (solid insulation) and oil, increases in temperature tend to force the moisture out of the cellulose into the oil, while decreases in temperature force the moisture out of the oil into the cellulose. This moisture migration has a long time constant, particularly at low temperatures, so that thermal cycling may produce wet and dry zones within the solid insulation. This, in turn, affects the rate at which streaming electrification occurs, as well as the amount of damage that it can cause. A uniform moisture distribution is preferred, which would be achieved by minimizing thermal cycling.

Of equal or greater importance is the avoidance of excessive temperature, which would lead to thermal degradation of both solid and liquid insulation, as well as increased losses due to the increase in resistivity of the windings of the transformer at the elevated temperature.

Besides, it has also been observed that the location of certain pumps may have a tendency to enhance the streaming electrification occurring in the lower regions of the transformer. If it should be observed that a given transformer pump contributed more to the streaming electrification than others, the pump should be eliminated from the regular sequence and energized only when needed.

Known recommended solutions for the above-stated problems include use of chemical additives (for instance, benzotriazole) and modification of the cooling system changing the heat exchangers and pumps in order to provide the same rate of cooling at a lower flow rate. Naturally, utilities have expressed considerable reluctance to use chemical additives, based on an incomplete understanding of their workings, and the concern that, once added to the system, the chemicals cannot be removed conveniently. Modification of the cooling system configuration may be expensive and time-consuming.

It, therefore, would be highly desirable to have a system for on-line monitoring and controlling of streaming electrification which would avoid the disadvantages of known solutions for the phenomena of streaming electrification in cooling systems of power transformers.

Disadvantageously, thermal models of transformers are incomplete and a model of the electrification processes in a transformer has only recently been developed, and is limited to only a sub-set (core-form with disc windings) of all large power transformers. Computational models require a detailed knowledge of the design of the transformer which is usually proprietary. Thus, to design a controller based on computational models would be self limiting, and could only be done for a single transformer model at a time.

It would, therefore, be highly desirable to have a controller adaptable to a variety of transformers regardless of their particular design and capable of controlling a number of continually changing parameters, so as to operate in flow and temperature regimes where both the problems of streaming electrification and thermal degradation of the insulation are minimized.

It is suggested in the art (for instance, in the article "Control of Dynamic Systems Using Fuzzy Logic and Neural Networks" by Ajay Patricar and John Provence) to use principles of fuzzy logic in combination with neural networks for control of dynamic systems, which are complex or non-linear and where it is difficult, if not impossible, to obtain a precise mathematical model of the system.

However, none of those intelligent controllers suggested or described in the prior art, is concerned with the problem of streaming electrification in large power transformers cooling systems and thermal degradation of the insulation in these systems.

SUMMARY OF THE INVENTION

It is, therefore, an object of the present invention to provide an intelligent controller taking advantage of advanced technologies (particularly, elements of fuzzy logic and neural networks) which will limit the problem of streaming electrification in oil and other coolants used in circulating systems.

It is another object of the present invention to provide a portable intelligent controller for the operation of a large power transformer cooling system, which will be relatively inexpensive and a non-invasive deterrent to the problem of streaming electrification, while not unduly increasing thermal aging of the insulation.

It is still an object of the present invention to provide an intelligent controller capable of taking any number of sensor inputs, including those having input noise, and also adaptable to a wide variety of transformers, having different internal configurations, different instrumentation, and different numbers of pumps.

Although the present invention is perfectly applicable to any situation where streaming electrification is known to be a problem (for instance, in cooling of hermetic motors, HVDC converter equipment, fuel handling, filtration equipment, and the like) the present invention finds its particular utility as a controller for a large power transformer cooling system, wherein a liquid medium (or coolant) is driven by pumps. In the system, an operation at excessive temperatures causes unwanted thermal degradation of the electrical insulation of the transformer, while an operation at excessive flow rates of the liquid medium and decreased temperatures causes undesired streaming electrification. Besides, a location and certain regimes of operation of the pumps may also enhance the streaming electrification.

According to the teachings of the present invention, an intelligent controller for on-line monitoring of transient operating conditions of the system and for maintaining these conditions within limits allowing to reduce streaming electrification and to minimize degradation of the insulation of the system, includes elements of fuzzy logic and neural network methods. The neural network serves as a computational means for the fuzzy logic. The fuzzy logic ("fuzzifier") interprets analog input data (acquired by means of a plurality of sensors) according to predetermined fuzzy membership functions and generates fuzzifier outputs, which are processed by a main processor. The main processor generates processor outputs indicative of appropriate instructions for the circulation system.

For each sensor, an instrumentation data structure is created which includes a plurality of user-specified level designations, such that each one of the fuzzy membership functions corresponds to a respective one of the level designations. By changing the level designations, the fuzzy logic allows minor modifications in operating conditions of the circulating system. The fuzzy logic is implemented with a pseudo-neural network configuration, which includes an input layer, a hidden layer, and an output layer, respectively. The analog inputs are received by the input layer, and each analog input for a single node is broken up into a plurality of output nodes, each output node serving as an input to the main processor. The connections from the input layer to the hidden layer are weighted as:

$$\omega_{n0} = \frac{1}{L_{n+1} - L_n}$$

wherein L designates the specified level designation and n ranges from one to four. A ramp function is used as an activation function for the hidden layer. The connections from the hidden layer to the output layer are weighted as:

$W_{ij}=1$ for j=i and $W_{ij}=-1$ for j=i, wherein $W_{ij}$ denotes the weight of the connection between the $i^{th}$ neuron of the previous layer and the current node. The analog inputs are given fuzzy memberships in five fuzzy regions of temperature regimes, such as: very low, low, medium, high and very high.

The main processor includes a fully connected feed-forward neural network having an input layer receiving the fuzzifier outputs, the number of which is five times the number of the analog input devices. At least one hidden layer—one hidden layer can be converted to two hidden layers if the control surface is so non-linear that the single hidden layer is insufficient to properly represent it—and an output layer are required.

For each layer in the main processor neural network, starting with said first hidden layer, an output of each node is computed as:

$$o_j = f\left(\sum_i^{N_i} \omega_{ij} o_i\right)$$

wherein $N_i$ is the number of nodes in the previous layer, $O_i$ is the output value of the $i^{th}$ node of the previous layer, $\omega_{ij}$ denotes the weight of the connection between the $i^{th}$ neuron of the previous layer and the current node, and f is the activation function, typically a sigmoid function:

$$f(x) = \frac{1}{1 + e^{-x}}$$

The number of nodes in the output layer of the main processor neural network includes four nodes and corresponds to processor control outputs and alarm outputs indicating appropriate instructions for the circulation system. The control outputs request for more cooling or for less cooling, and the alarm outputs are indicative of an instrumentation failure or for streaming electrification danger.

The intelligent controller also includes a pump operator interpreting the control outputs from the main processor into a relay operation of the pumps in the circulation system. The pump operator includes a user specified time-delay to allow a contribution of at least one pump to stabilize before another of the plurality of the pumps is permitted to be energized.

The pump operator further includes two alarms, one alarm for signaling an over-temperature condition, and the other alarm for signaling a malfunction or unexpected operating regime.

A method for controlling the circulation system operation and implementing the above-discussed controller, includes the steps of providing a controller which combines elements of fuzzy logic and neural network, wherein the neural network serves as a computational means for the fuzzy logic, and acquiring input data on operation of the circulation system from a plurality of sensors, predetermining fuzzy membership functions and interpreting the input data means of the fuzzy logic according to the predetermined fuzzy membership functions, thereby obtaining fuzzifier outputs, processing the fuzzifier outputs by means of the main processor, thereby obtaining processor outputs indicating of appropriate instructions for the circulation system, and operating the circulation system in regimes according to these instructions, thereby minimizing the thermal degradation of the transformer electrical insulation and limiting the problem of streaming electrification.

These and other objects of the present invention will become apparent from a reading of the following specification taken in conjunction with the enclosed drawings.

DETAILED DESCRIPTION OF THE INVENTION

Figure 1:
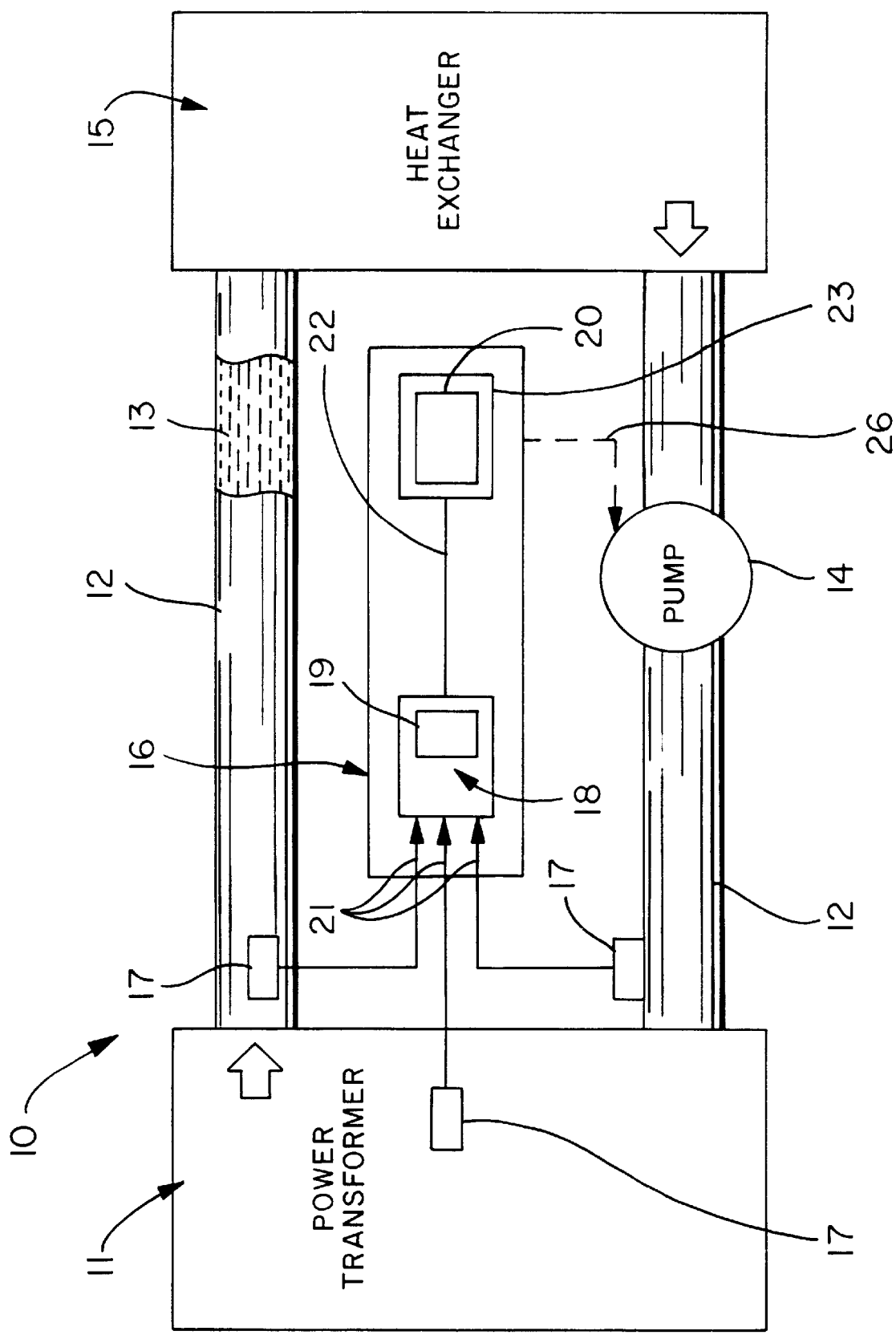
FIG. 1 is a schematic diagram of a cooling system for a power transformer showing the controller of the present invention.

Referring to FIG. 1, a cooling circulation system 10 for a power transformer 11 includes pipes 12. These pipes 12 circulate a cooling fluid 13 driven by a pump (or pumps) 14 for carrying excessive heat from the power transformer 11 to a heat exchanger 15 and back to the power transformer 11, thereby cooling the power transformer 11 by circulation of fluid through its internal ducts (as is well known to those skilled in the art).

A controller 16 is installed for on-line monitoring of the cooling system 10. The controller 16 takes any number of inputs from a plurality of sensors 17 for determining the optimal operation of the pump(s) 14. Instrumentation is currently available to provide inputs of transformer load, transformer top oil temperature (which in turn may be used to compute the hot spot temperature in the preprocessing conversion, for example), flow rate, charge density in the oil, neutral leakage current, electrostatic charging tendency, moisture, gas in the oil (indicative of electrical discharges or unusually high local temperatures), partial discharge rate and magnitude and others. However, since not all of these sensors are available on all transformers, the controller 16 is adaptable to whatever sensors 17 may be available.

Figure 2:
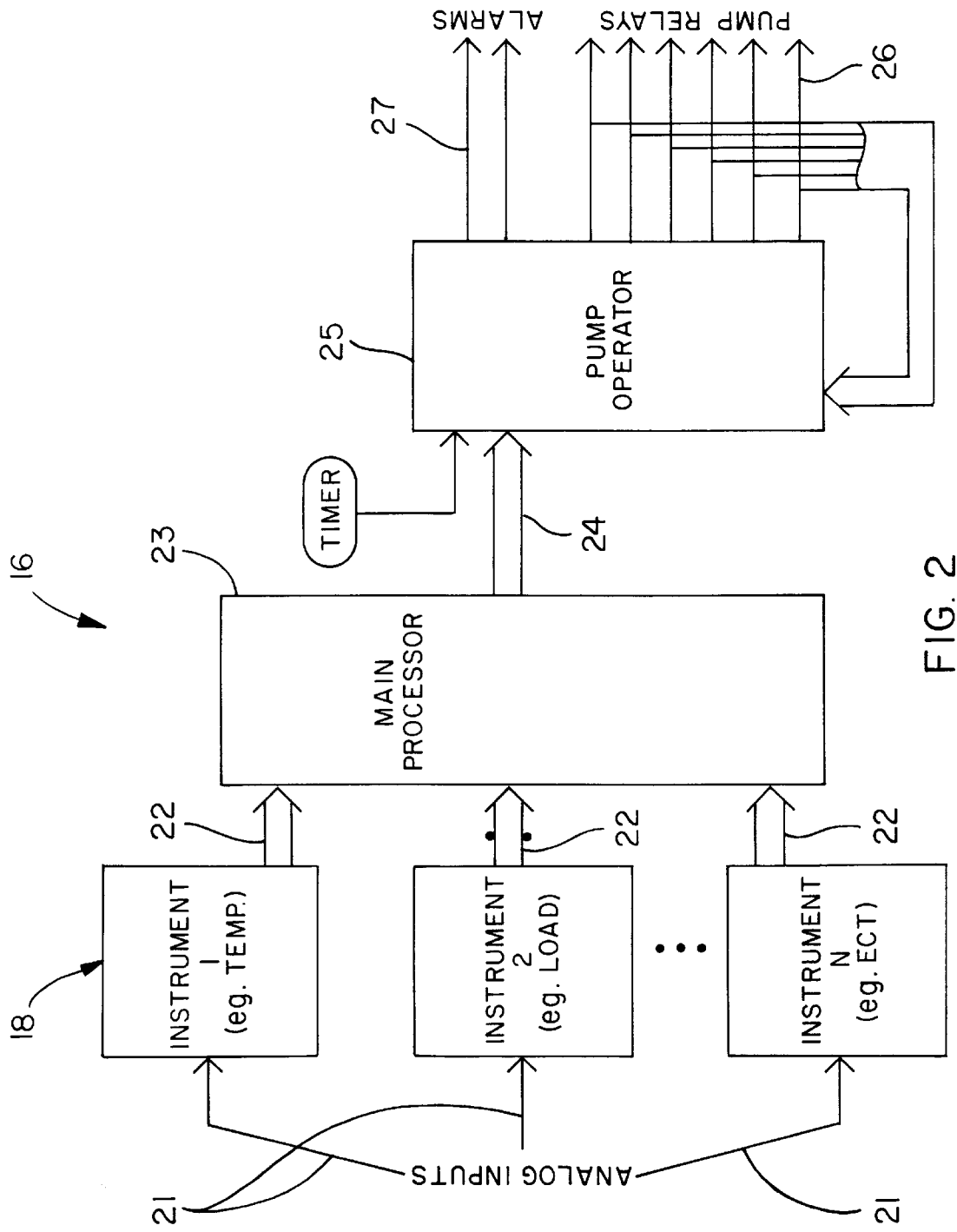
FIG. 2 is a block diagram showing the modular design of the controller of the present invention.
Figure 5:
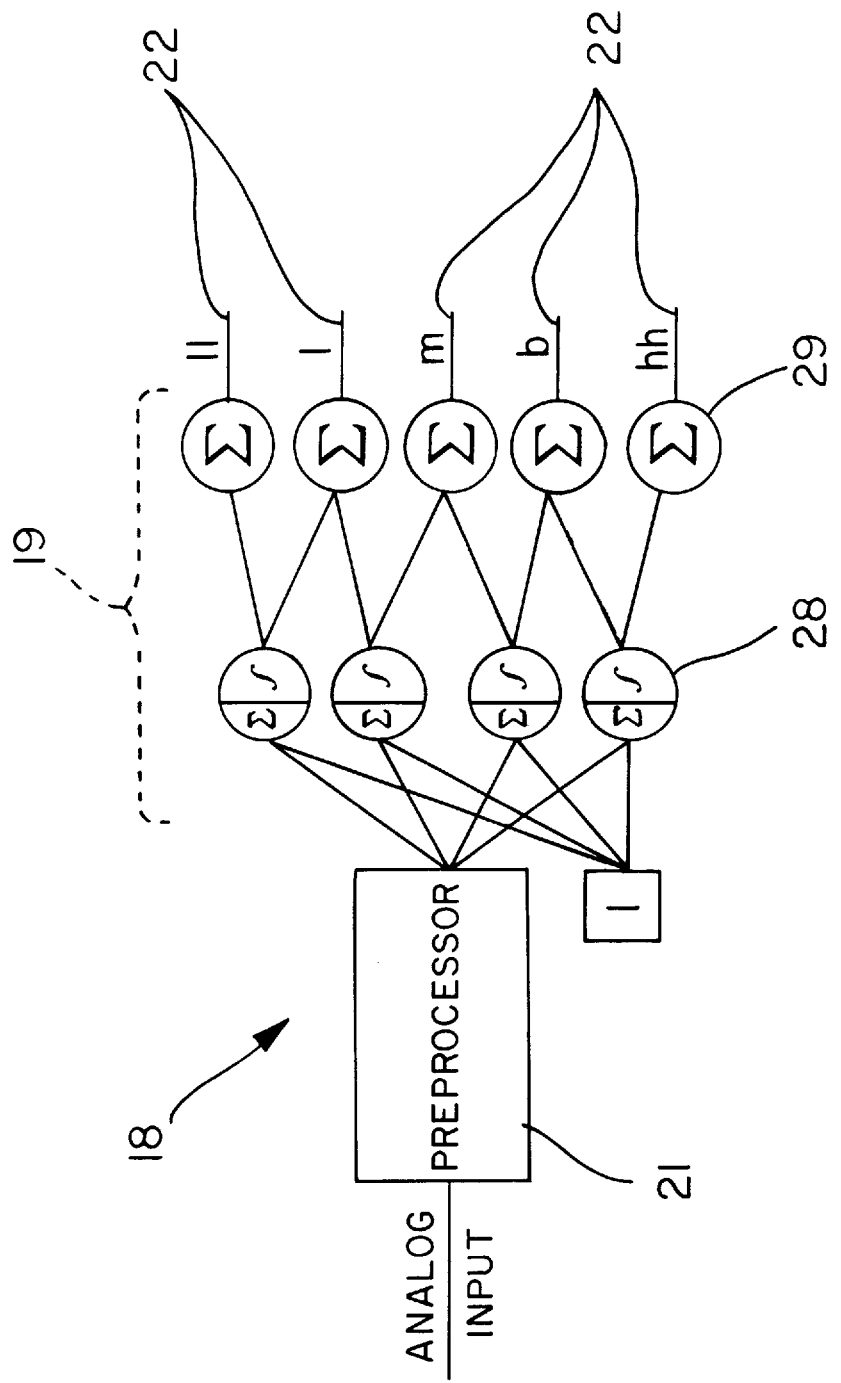
FIG. 5 is a schematic diagram showing an input fuzzifier of the present invention.
Figure 7:
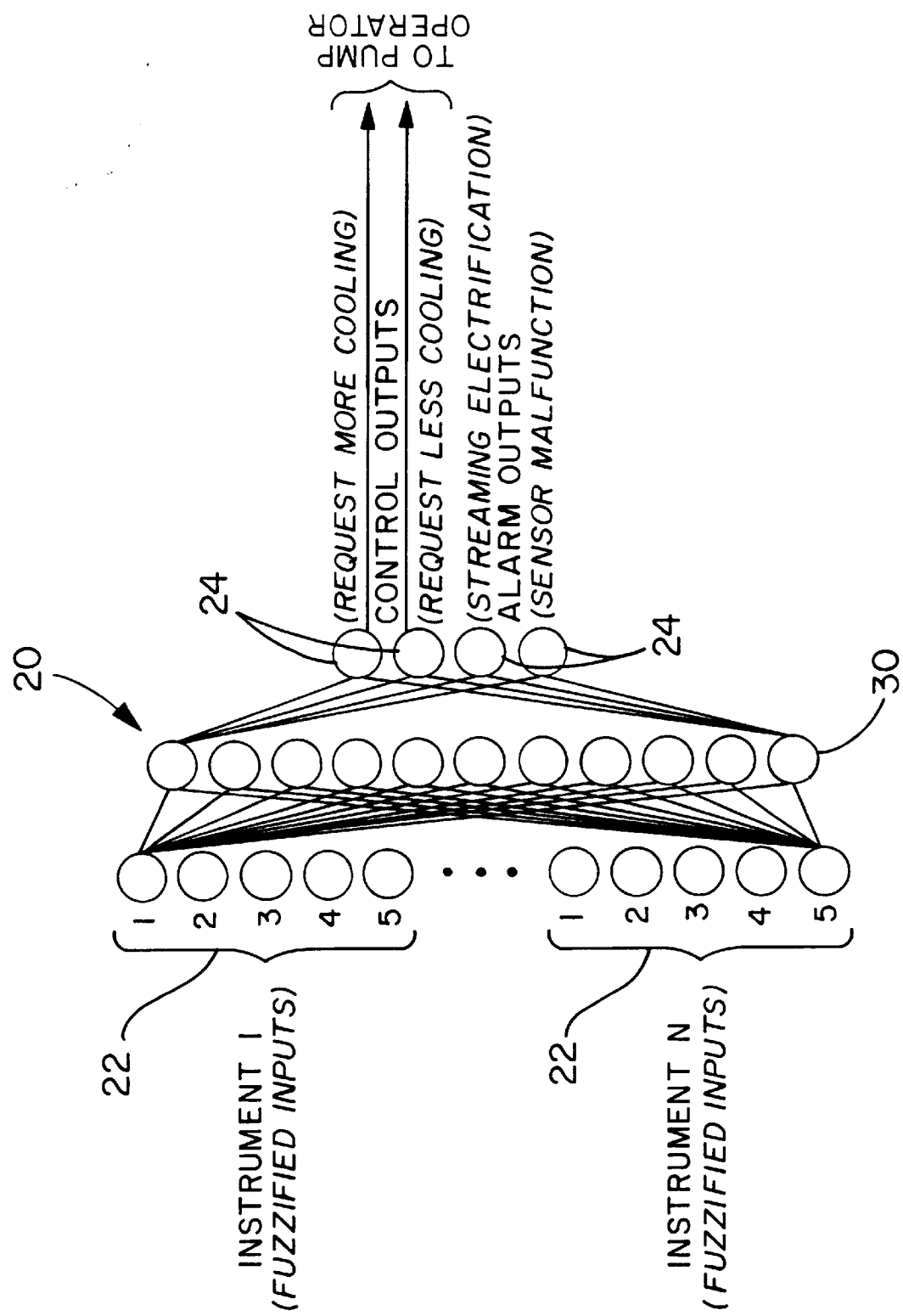
FIG. 7 is a schematical diagram of the main processor neural network.

Referring to FIGS. 2, 5 and 7, the controller 16 includes a combination of fuzzy logic 18 and neural networks 19 and 20. The selection of fuzzy logic was based on the continuous nature of the inputs and the likelihood of high noise levels, the absence of a complete and simple model of the processes involved, and the availability of laboratory data on which to formulate a set of operational rules.

In order to be practical, the controller 16 is transferable to a wide variety of transformers, having different internal configurations, different instrumentation, and different numbers of pumps 14. One of the problems with the use of fuzzy logic, however, is the difficulty of defining and encoding the rules, and the need to redefine and re-encode such rules for each application. A neural network, on the other hand, requires only a simple retraining to provide for the necessary adaptations. Furthermore, while research continues, more knowledge and a greater understanding of the phenomena involved, as well as technological advances in instrumentation, may require changes in the controller design. The neural network of the present invention is adaptable for the application of such changes.

Another issue is computational. Determination of the appropriate control output requires an evaluation of all inputs, including their interdependency. With two analog inputs that are continuous over some range, there is an infinite number of possible combinations; however, a linear interpolation is possible. Unfortunately, if the number of inputs increases to five or six, it effectively becomes a problem of interpolating on a five or six dimensional control surface. One of the major strengths of neural networks is the ability of their inference mechanism to interpolate for a system of this level of complexity.

The intelligent controller 16 comprises elements of fuzzy logic 18 and neural networks 19 and 20, which serve as a computational means for the fuzzy logic 18. A plurality of analog inputs 21 from the sensors 17 acquire input data on operation of the circulation system 10, and the transformer 11.

The fuzzy logic 18 interprets the input data according to predetermined fuzzy membership functions (to be discussed below) and generates fuzzifier outputs 22.

A main processor 23 receives the fuzzifier outputs 22 and processes them. The main processor 23 generates processor outputs 24 which are indicative of appropriate instructions for the circulation system 10. A pump operator 25 interprets the processor outputs 24 into a relay operation of the pumps 14.

As best shown in FIG. 2, a modular approach is taken in the design of the controller 16 in order to maximize portability For example, if one component of instrumentation (to be discussed below) is unavailable, the main processor 23 can be retrained without that input. If the transformer 11 is specifically designed to operate at higher or lower temperatures, the temperature input module could be modified appropriately without any change to the main processor 23.

Figure 3:
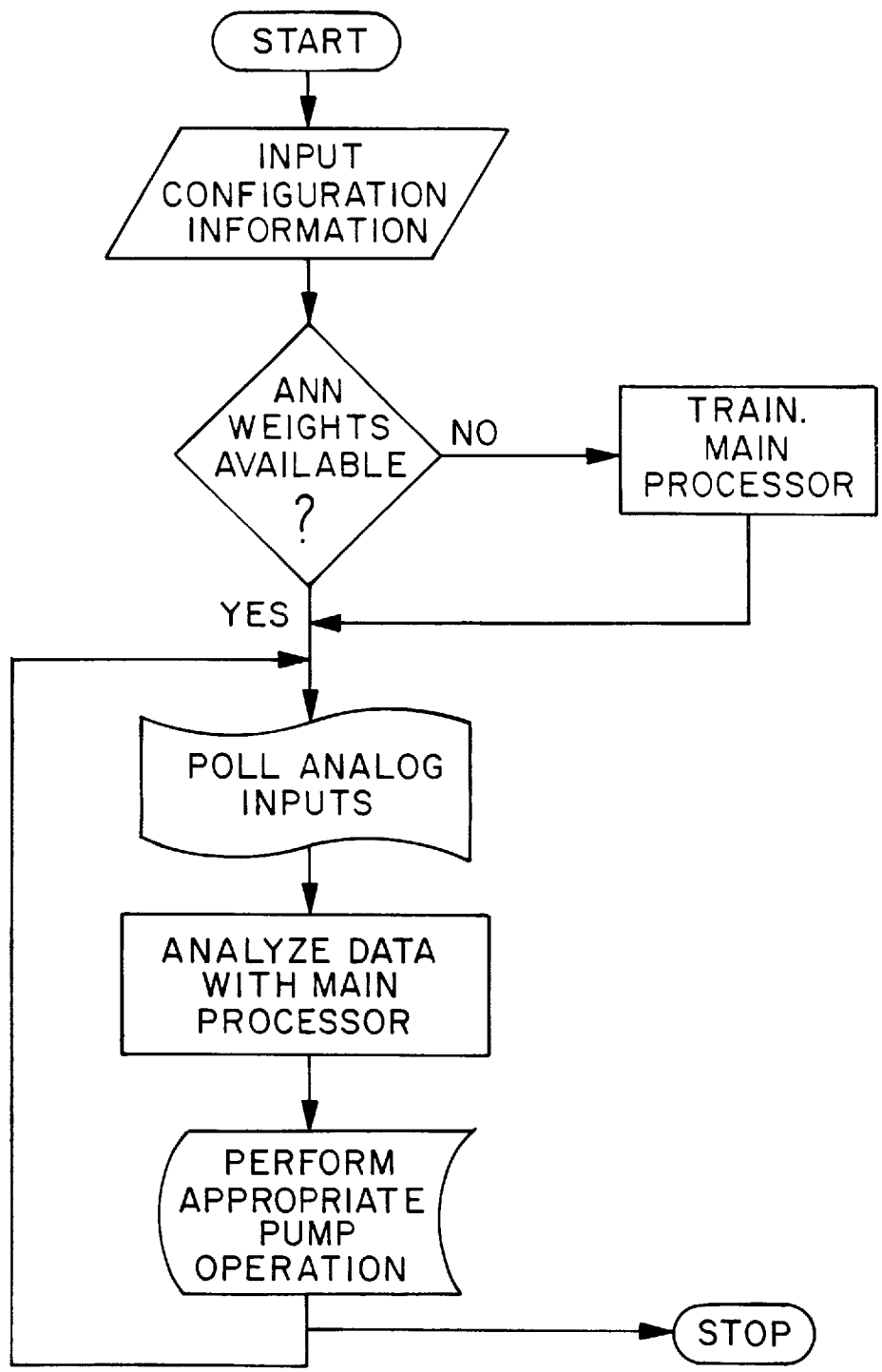
FIG. 3 is a flow-chart of a software of the controller of the present invention.

As best shown in FIG. 3, showing the flow-chart of the software implementation of the controller 16, an input stage reads all data files, prompting the initial user for missing information. After the weights for the neural network 20 are obtained, either from a file, or through training if a file with the correct configuration of weights is not available, the program enters a control loop. First, analog instrumentation for each sensor 17 is polled and each analog input 21 is broken down by a fuzzifier module 18 which indicates the fuzzy membership of each analog input. The fuzzy membership outputs 22 are the inputs to the main processor 23 which has four processor outputs 24. Two of those outputs 24 correspond to signals requesting for more cooling or for less cooling, respectively, while the other two represent alarms that signal an instrumentation failure, or a streaming electrification danger, respectively. Finally, the pump operator 25 takes the control outputs 24 of the main processor 23, and has one output 26 for each pump in addition to two alarm outputs 27 which indicate an over-temperature condition or main processor malfunction, respectively.

The operation stage of the software includes data acquisition and fuzzification, computation, and pump operation, which are performed in a continuous cycle until an interrupt halts the program.

Figure 4:
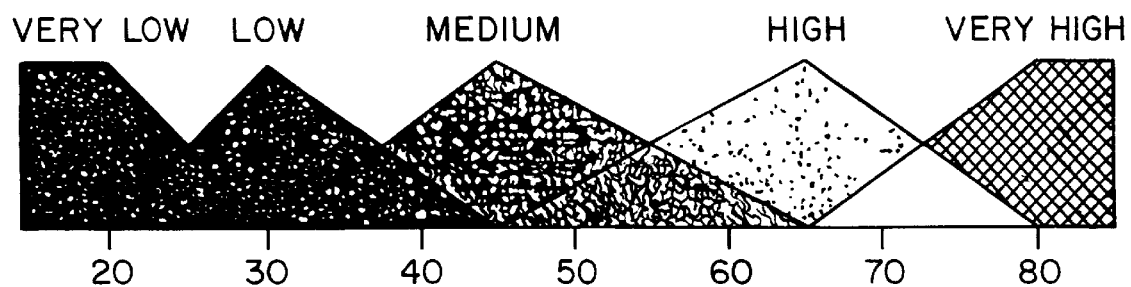
FIG. 4 shows an example of Fuzzy Membership Functions for temperature.

An instrumentation data structure is created for each sensor input 21. That structure includes instructions for polling the equipment via D/A board, serial communications, GPIB interface, etc., as well as any instrument-specific preprocessing. The instrumentation data structure also includes five user-specified level designations, which are used to direct the fuzzifier 18 to interpret the data according to the desired fuzzy membership functions as are generally used in typical fuzzy logic systems. In this application, an arbitrary distribution of the membership function peaks will be linearly interpreted as shown in FIG. 4, illustrating the typical arrangement of membership functions. As an example, for the case shown, if the input indicates temperature of 65° C., the fuzzifier outputs 22 would all be equal to zero, except for a one on the 'high' level output, while for a value of 55° C., the 'medium' level output would register 0.5 as would the 'high' level output, while all others would be zero. The fuzzifier 18 is implemented with a pseudo-neural network configuration 19, as best shown in FIG. 5, taking the analog signal as an input 21, and giving the fuzzy membership in five fuzzy regions of operating parameter regimes (very low, low, medium, high, and very high) as fuzzifier outputs 22. Because of the simplicity of the neural network 19, the weights may be computed directly. Weights on connections from the input to the hidden layer 28 are computed from the level indicators as $$\omega_{n0} = \frac{1}{L_{n+1} - L_n} \quad (1)$$

where n ranges from one to four, and L indicates the specified level designation. The bias connections are weighted as $$\omega_{n1} = -\frac{L_n}{L_{n+1} - L_n} \quad (2)$$

Figure 6:
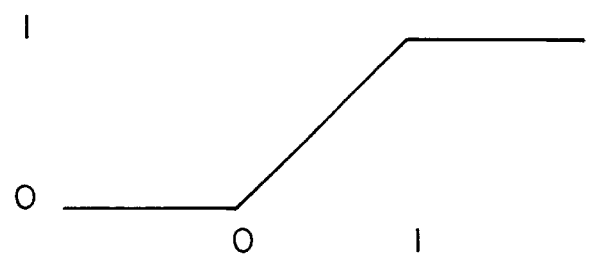
FIG. 6 is a diagram of a ramp function used as an activation function for the fuzzifier hidden layer.

A ramp function is used as the activation function, as best shown in FIG. 6. While this function is not continuously differentiable, which is a requirement for training by backpropagation, that algorithm is not necessary on this simple fuzzifier network 19. The connections from the hidden layer 28 to the output layer 29 are weighted as:

$W_{ij}=1 \; j=i$ $W_{ij}=-1 \; j=i+1$

It will be appreciated by those skilled in the art, that 'i' identifies a neuron in a previous layer and 'j' identifies a respective neuron in a successive layer. No activation function is required on the output stage of the fuzzifier, as the above configuration yields the desired membership functions directly.

The use of fuzzy inputs serves a dual purpose. It both breaks up the analog range of inputs 21 for a single node into five output nodes and allows minor modifications in operating conditions without retraining or reprogramming. For example, if the network 20 is trained to operate the transformer 11 at medium temperature when charge density levels are in the low range, the actual operating point may be modified slightly by changing the definition of either medium temperature or low charge density.

The computational unit of this controller (the main processor 23) is based on a typical fully connected feed-forward neural network 20, best shown in FIG. 7. It will be appreciated by those skilled in the art, that feed-forward neural networks trained by back propagation consist of several layers of simple processing elements called neurons, interconnections and weights that are assigned to the interconnections.

The output and the hidden layers are processing (consisting of processing or active nodes), and the input layer is non-processing (consisting of passive nodes). Each active layer computes and filters the weighted sum of its inputs. The neurons are interconnected in such a way that information relevant to the input/output mapping is stored in the weights. Each neuron contains the weighted sum of its inputs filtered by a sigmoid (S-shaped) transfer function. The layers of neurons in the back propagation (BP) networks receive, process, and transmit information on the relationships between the input parameters and corresponding responses. Besides the input and output layers, these networks incorporate one or more "hidden" layers of neurons, which do not interact with the outside world, but assist in performing classification and nonlinear feature extraction tasks on information provided by the input and output layers.

In the BP learning algorithm, the network begins with a random set of weights. An input vector is fed forward through the network, and the output values are calculated using this initial weight set. Next, the calculated output is compared to the measured output data, and the squared difference between this pair of vectors determines the system error. The accumulated error for all of the input-output pairs is defined as the Euclidean distance in the weight space. The network attempts to minimize this Euclidean distance by means of the gradient descent approach, in which the network weights are adjusted in the direction of decreasing error.

As best shown in FIG. 7, the number of inputs to the main processor 23 will be five times the number of sensors 17, and the processor outputs 24 consist of the four, as described above. There is one hidden layer 30 which may be converted to two if the control surface is so nonlinear that the single hidden layer is insufficient to properly represent it.

For each layer, starting with the first hidden layer 30, the output of each node is computed as $$o_j = f\left( \sum_i^{N_i} \omega_{ij} o_i \right) \quad (3)$$

where $N_i$ is the number of nodes in the previous layer, $O_i$ is the output value of the $i^{th}$ node of the previous layer, $\omega_{ij}$ denotes the weight of the connection between the $i^{th}$ neuron of the previous layer and the current node, and f is the activation function, typically a sigmoid function:

$$f(x) = \frac{1}{1 + e^{-x}} \quad (4)$$

If, upon initiation of the program, the correct weight file is not available, then the network 20 must be trained. This is done using a standard back propagation algorithm:

$$\omega_{ij}^{(N+1)} = \omega_{ij}^{(N)} + \Delta\omega_{ij}^{(N+1)} \quad (5)$$

where $W_{ij}$ denotes the weight of the connection between the $i^{th}$ and $j^{th}$ neurons of successive layers, and wherein $$\Delta\omega_{ij}^{(N+1)} = \left( \sum_p \eta \delta_j i_i \right) + \alpha \Delta\omega_{ij}^{(N)} \quad (6)$$

where the summation is over all training patterns, $\eta$ is the learning rate $\delta_j$ is the error correction factor for the $j^{th}$ neuron in the second of the two layers being considered, and is the learning momentum constant. The $\delta$ terms are computed for each layer successively working from the back or output layer. For the output layer, $$\delta_j = (t_j - O_j)(1 - O_j)O_j \quad (7)$$

where $t_j$ is the expected output specified in the current training pattern, and $O_j$ is the actual output for the current pattern in the $j^{th}$ node. For each successive hidden layer, the $\delta$ terms are computed as:

$$\delta_j = \left( \sum_{k=1}^{\eta} \delta_k \omega_{kj} \right) o_j (1 - o_j) \quad (8)$$

where the summation is over all error factors in the next layer times the corresponding connecting weight.

The actual training process proceeds as follows: the training patterns are obtained by reading from a pattern file, and the weights are initialized. If the weights are not available from a previous training session, they are initialized to random values between 1 and −1. Each of the training patterns is then used, together with the current weights, to compute a current output, from which the errors are computed as described in the above equations. The weights are then updated and the program cycles until the number of patterns for which the output is not within a specified tolerance of the desired output falls to zero, or until the specified maximum number of iterations is reached.

The pump operator 25 interprets the instructions to increase or decrease cooling into a relay operation for the appropriate pump 14. The selection of which pump to energize is based on a user specified sequence which may exclude any pumps that may be of construction or position which makes them especially generous in the enhancement of streaming electrification. It was observed, for example, that in a series of factory streaming electrification tests, the pump that discharged oil into the end of the transformer enhanced the streaming electrification enough to cause damaging partial discharges, unless another pump discharged a perpendicular stream.

The pump operator 25 includes a user-specified time-delay to allow the contribution of one pump to stabilize before another pump is permitted to be energized. This also avoids the superposition of multiple short-term dynamics in streaming electrification effects. Besides, forcing a time delay limits the cycling of pumps, the resultant wear on relay contacts and pump motors.

In addition to outputs 26 controlling the pump relays, the pump operator 25 includes two alarms 27. One alarm 27 signals that more cooling has been requested when all pumps 14 were already energized, suggesting an over-temperature condition. The other alarm signals that the main processor 23 is requesting more and less cooling simultaneously-suggesting a malfunction or unexpected operating regime.

In order to evaluate the viability of the intelligent controller 16, a simulation has been performed. The case used was artificial, although some effort was made to approximate typical characteristics. For example, power was made to fluctuate sinusoidally like a daily load cycle, and charge density was made to increase with flow and exhibit a peak in midrange of temperature. The controller configuration used for the example cases consisted of five sensors: Power, Temperature, Flow, Electrostatic Charging Tendency ("ECT"), and Charge Density. A transformer with six pumps was assumed for the two cases considered. During the first, the ECT remained constant, so that the charge density characteristic as a function of flow and temperature remained constant. This allowed for consideration of regular operation for a relatively low charging system. The second case included a linearly increasing charging tendency, with an equivalent linear increase in charge density. This allowed the opportunity to see how the controller modified its operating point for different streaming electrification conditions.

One major part of preparing the controller 16 is obtaining an appropriate training set. In preparing this, one must consider both thermal and streaming electrification aspects, as well as the interaction between the two. The purpose of the controller 16 is to maintain a temperature condition that is the lowest reasonable without posing a streaming electrification danger.

The first step is the consideration of fuzzy memberships and what the meaning of them should be. For example, consideration should be made at what power level a minimal number of pumps should be on, ie., if natural convection no longer suffices at 5% of full load, this level should be taken as low load, and the fuzzy training table should respond with instructions to drive cooling to low flow for low load and low temperatures, and so forth.

Figure 8:
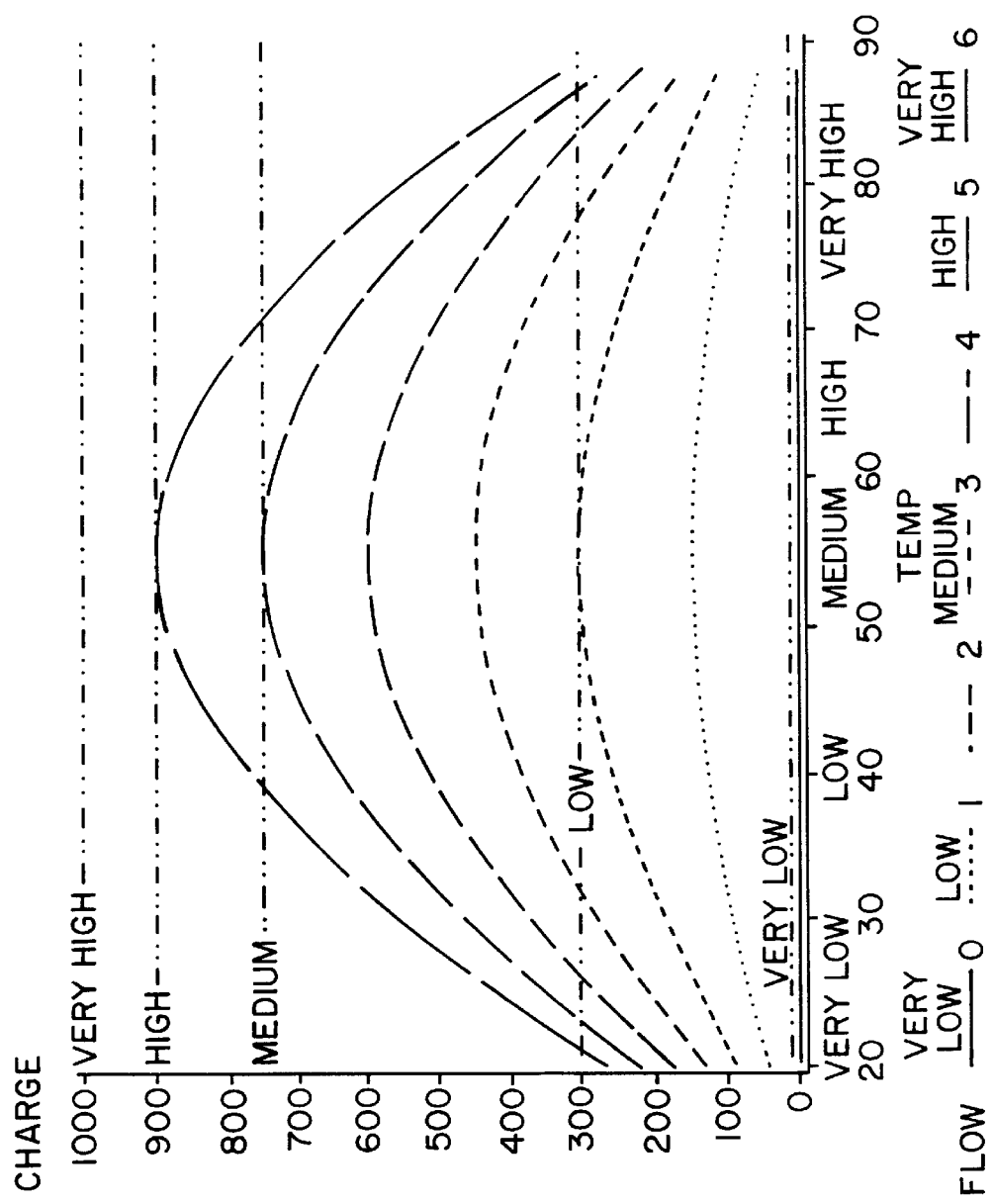
FIG. 8 is a diagram of a charge as a function of temperature and flow for the simplified transformer example.

Streaming electrification may be considered together with the temperature and flow rate, independent of the transformer loading. One may expect that if the streaming electrification is low, as indicated by both the charging tendency and the charge density, then a lower temperature is permissible. On the other hand, if either streaming electrification characteristic indicates high, then it would be desirable to operate at a higher temperature, because the flow rate would be lower, and the temperature would be driven beyond the characteristic peak that is seen in charging characteristics in transformers (typically around 55° C.). The streaming electrification characteristics are, of course, particularly important in considering the operation of the alarm function of the controller. In this, one must consider the allowable characteristics and the expected characteristics. For example, the highest expected charge density would be in the vicinity of the temperature peak, at maximum flow. By considering a plot of the charging characteristic of the transformer, as determined empirically or by a model such as that described in the article "A Full-Scale Simulation of Streaming Electrification in a Large Core-Form Transformer Winding" by M. A. Brubaker and J. K. Nelson, one may determine the expected charging levels for various operating conditions, and train the controller to sound an alarm when those levels are exceeded. For the simplified model used in this example, the charging characteristic is plotted in FIG. 8. From this, it may be seen that the maximum expected charging would be at very high flow but at medium temperature. Medium charge density may be that which would be expected for maximum flow at some other temperature, or medium flow at the temperature peak, and low charge density may be that expected for low flow, etc. Thus, if very high charge density is encountered at any temperature, or if high charge density is encountered for high flow, or very high flow and low temperature, etc., the alarm would sound. One may expect that the charge density would be very low for no flow, so the alarm would be energized if that expectation is violated, and so on.

This same line of reasoning may be used to evaluate the functionality of the equipment. For example, if the charge density measurement indicates high when the flow measurement indicates very low, the alarm indicating a possible sensor malfunction would be energized. Likewise, if all sensors simultaneously indicate very high, this is such an unlikely event that this may be construed as a possible sensor malfunction. Thus, one may proceed logically considering the possible conditions that are most unlikely for normal operation of the controller, and enter those possibilities into the fuzzy membership table.

Figure 9:
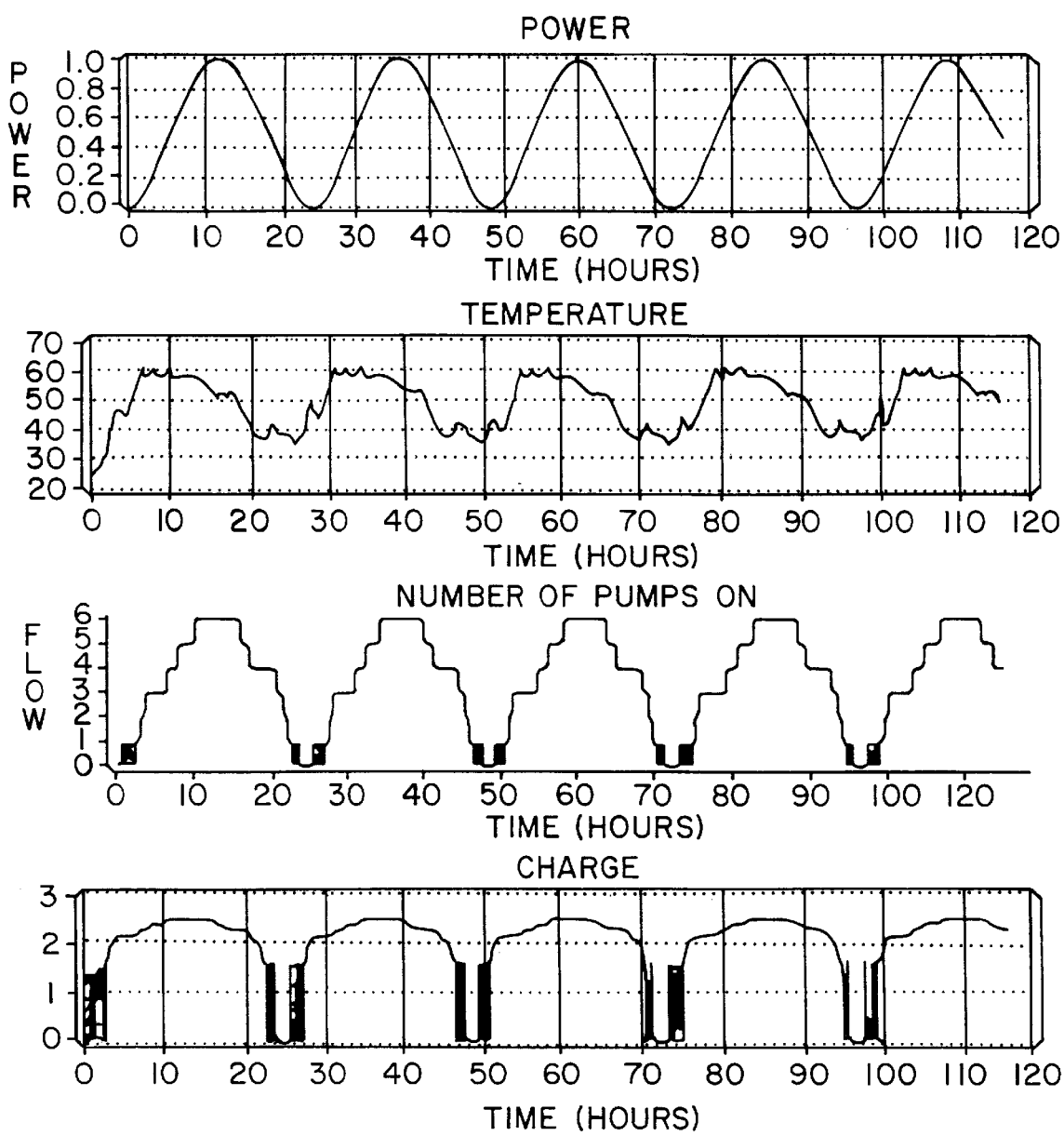
FIG. 9 is a diagram showing output variables when ECT is maintained low and constant.

The operation of the trained network takes only a few milliseconds per cycle. The results from the first case are shown in FIG. 9. It may be seen that the system operates properly: the temperature stabilized at a maximum of about 60 degrees, and the pumps were all off at the lower temperatures, except when the load was sufficiently high to require it. During the course of the run, no alarms were energized.

Figure 10:
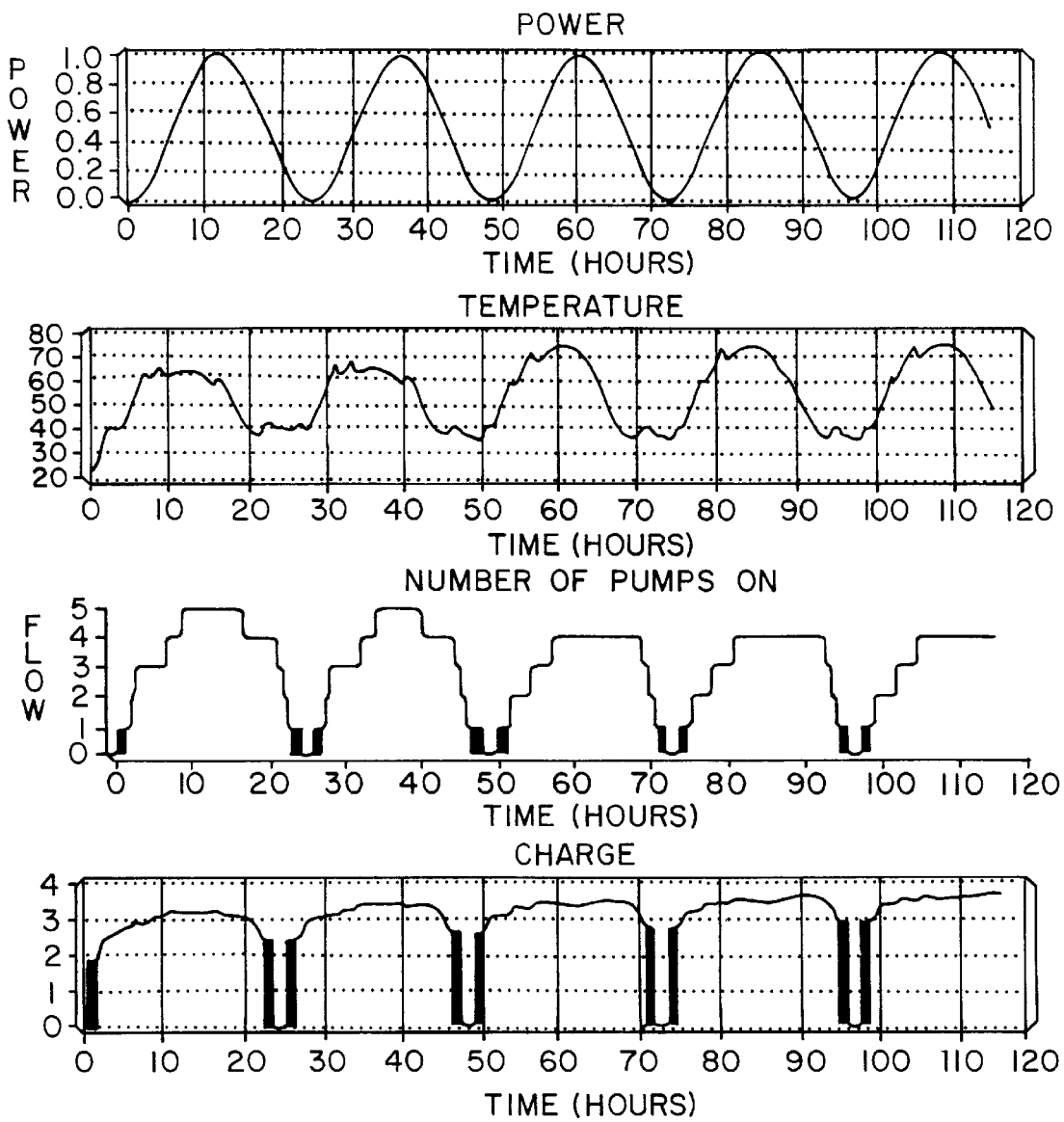
FIG. 10 is a diagram showing output variables when ECT is linearly increasing.
Figure 11:
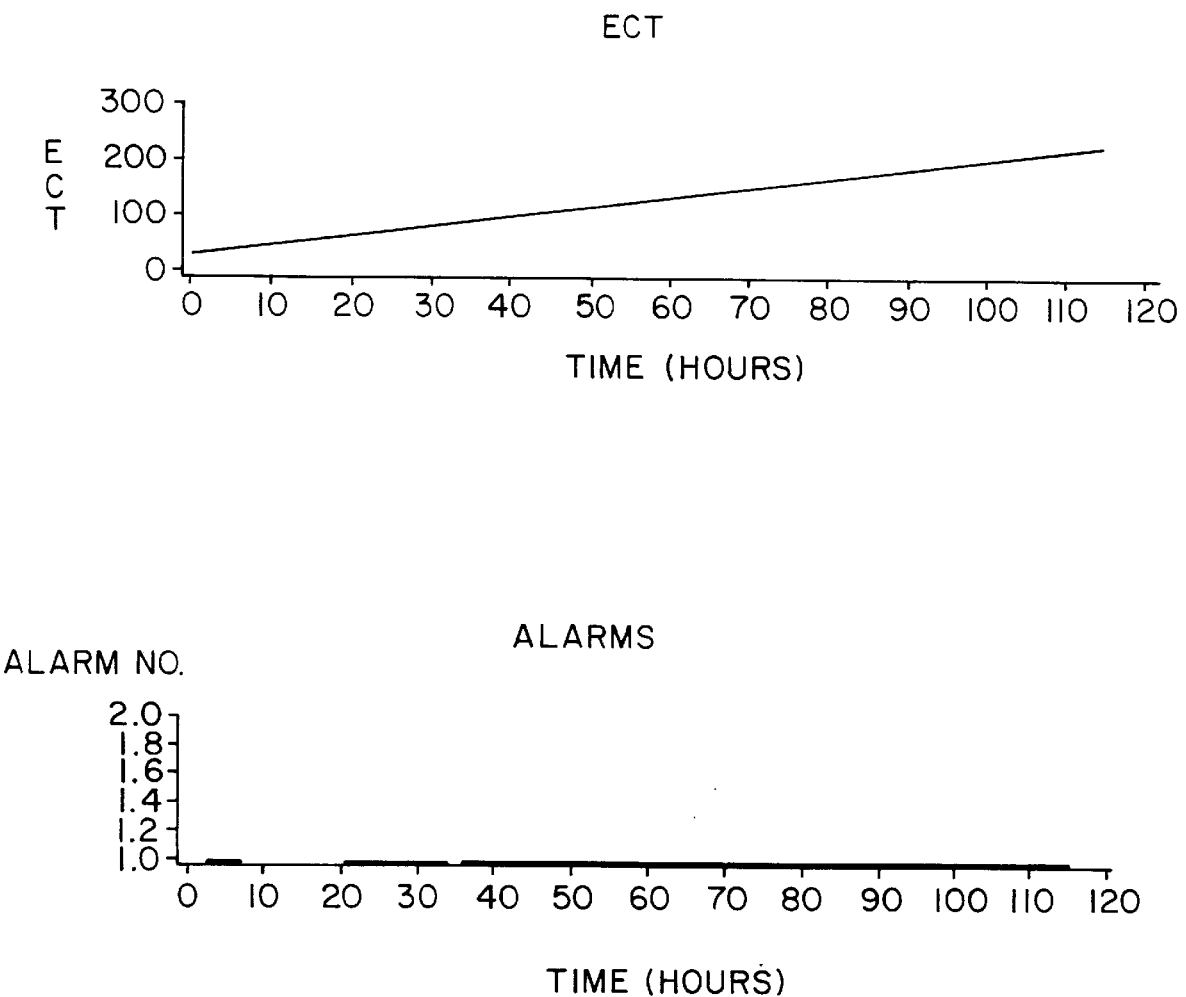
FIG. 11 is a diagram showing an indication of the alarm outputs and ECT levels.

The results from the second case are shown in FIG. 10. FIG. 11 includes an indication of the alarm outputs and ECT levels, wherein alarm 1 indicates a streaming electrification danger and alarm 2 indicates a sensor warning. From these figures it is seen that the first cycle operates at nearly the same level as the previous case, but as the charge density and ECT increased over time, the transformer operated at higher temperatures with less pumps, in an effort to compensate, to hold the charge density lower.

Industry is now in a quandary as to the appropriate action to take for the prevention of failures and damage to transformers as a result of streaming electrification. While much laboratory research has been undertaken to explain the phenomenon, few practical remedies have been proposed.

This initiative has been taken with the hope of filling the obvious gap. It is believed that an intelligent controller which performs the functions described above may have very significant applications in industry. As transformer failures, due to streaming electrification and/or insulation failure, involve substantial costs in down time and repair or replacement costs, the investment which would be required for the hardware implementation of such a controller would be very justified. It is even conceivable that the costs of such a controller may well be compensated by the more efficient operation and extended life of the transformer due to the lower temperatures, while operating only as many pumps as necessary. There has been some discussion that over-cooling of transformers would increase efficiency, due to the lower resistivity of the windings. Making that consideration a part of this controller would be as simple as generating a new training set (which would drive transformer operation to low temperatures when operating load is medium or greater, unless the charge measurement indicates undesirable conditions, and so on), and retraining the controller.

Obviously, many modifications may be made without departing from the basic spirit of the present invention. Although the intelligent controller discussed above, has been disclosed with regards to power transformers, it will be appreciated by those skilled in the art that the controller has been designed with attention to adaptability and portability in order to maximize the applicability to any kind of transformers, and practically to any equipment where the streaming electrification may be a problem, for example, cooling of hermetic motors, HVDC converters, fuel supplying equipment, filtration systems, etc.

Accordingly, it will be appreciated by those skilled in the art that within the scope of the appended claims, the invention may be practiced other than has been specifically described herein.

What is claimed is:

1. In a system comprising a power transformer having a cooling system, wherein a liquid coolant is driven by at least one pump to circulate through a transformer and at least one heat exchanger, wherein an operation at excessive temperatures causes unwanted thermal degradation of an electrical insulation of the transformer, excessive flow rates of the liquid coolant and decreased temperatures cause an undesired streaming electrification, wherein a location and certain regimes of operation of said at least one pump may enhance the streaming electrification, and wherein temperature regimes of operation of the cooling system and flowing rates of the liquid coolant are subject to transients during the operation of the cooling system an intelligent controller comprising:

elements of fuzzy logic and neural network,
   plurality of analog inputs acquiring input data on operation of the circulation system, a main processor, and instrumentation for designation of a plurility of level designations for said analog inputs,
   said fuzzy logic interpreting said input data according to predetermined fuzzy membership functions and generating fuzzifier outputs, wherein each fuzzy membership function corresponds to a respective one of said level designations, said analog inputs are given fuzzy memberships in the fuzzy regions of operating parameter regimes, such as; very low, low, medium, high and very high,
   said fuzzy logic further breaking up the analog inputs for a single node into a plurality of fuzzifier output nodes and allowing minor modifications in operating conditions of the cooling system by changing said level designations,
   the fuzzy logic being implemented with a pseudo-neural network configuration, the pseudo-neural network configuration including an input layer, a hidden layer and an output layer, wherein the analog inputs are inputted into the input layer,
   wherein a ramp function is used as an activation function for the hidden layer, and
   wherein said fuzzifier outputs from the output layer of the fuzzy logic are processed by the main processor, said main processor includes a fully connected feed-forward neural network having an input layer receiving said fuzzifier outputs, a number of these fuzzifier outputs being five times the number of said analog inputs acquiring input data, at least a first hidden layer and an output layer, and
   wherein the number of nodes in the output layer of the main processor neural network includes four nodes and corresponds to processor outputs indicating control outputs and alarm outputs, said control outputs request for more cooling or for less cooling, and said alarm outputs are indicative of an instrumentation failure or for streaming electrification danger, and a pump operator interpreting the control outputs from the main processor into a relay operation of said at least one pump, and further including two alarms, one alarm for signaling an over-temperature condition, and another alarm for signaling a malfunction or unexpected operating regime.

2. The system of claim 1, further including a plurality of user-specified level designations for said analog inputs, wherein each one of said fuzzy membership functions corresponds to a respective one of said level designations.

3. The combination of claim 1, wherein said fuzzy logic breaks up the analog inputs for a single node into a plurality of output nodes.

4. The system of claim 2, wherein said fuzzy logic allows minor modifications in operating conditions of the circulating system by changing said level designations.

5. The system of claim 2, wherein the fuzzy logic is implemented with a pseudo-neural network configuration, wherein the pseudo-neural network configuration includes an input layer, a hidden layer and an output layer, wherein the analog inputs are inputted into the input layer, wherein connections from the input layer to the hidden layer are weighted as:

$$\omega_{no} = \frac{1}{L_{n+1} - L_n},$$

wherein L designates the specified level designation and n ranges from one to four,
wherein bias connections are weighted as:

$$\omega_{ni} = -\frac{L_n}{L_{n+1} - L_n},$$

and
wherein a ramp function is used as an activating function for the hidden layer.

6. The system of claim 2, wherein the analog inputs are given fuzzy memberships in five fuzzy regions of operating parameter regimes, such as: very low, low, medium, high and very high.

7. The system of claim 1, wherein the neural network of the main processor has an input layer receiving said fuzzifier outputs, a number of said fuzzifier output is five times the number of said analog inputs, at least a first hidden layer and an output layer.

8. The system of claim 7, wherein the neural network of the main processor includes a fully connected feed-forward neural network.

9. The system of claim 7, wherein the number of nodes in the output layer of the main processor neural network includes four nodes and corresponds to processor outputs indicating appropriate instructions for the circulation system.

10. The system of claim 1, wherein the main processor outputs include control outputs and alarm outputs, wherein said control outputs request for more cooling or for less cooling, and wherein said alarm outputs indicate an instrumentation failure or the streaming electrification danger.

11. The system of claim 1, further including a pump operator interpreting the control outputs from the main processor into a relay operation of said at least one pump.

12. The system of claim 11, wherein the circulation system further includes a plurality of said pumps, wherein said pump operator includes a user specified time-delay to allow a contribution of said at least one pump to stabilize before another of said plurality of the pumps is permitted to be energized.

13. The system of claim 11, wherein said pump operator further includes two alarms, one alarm for signaling an over-temperature condition, and another alarm for signaling a malfunction or unexpected operating regime.

14. In a power apparatus having a circulation system for cooling purposes, wherein a liquid medium is driven by at least one pump to circulate through the power apparatus and a heat exchanger, wherein an operation at excessive temperatures causes an unwanted thermal degradation of an electrical insulation of the power apparatus, wherein an operation at excessive flow rates of the liquid medium and decreased temperatures cause undesired streaming electrification, wherein a location and certain regimes of operation of said at least one pump may enhance the streaming electrification, and wherein temperature regimes of operation of the circulation system and flowing rates of the liquid medium are subject to transients during the operation of the circulation system, a method for controlling the circulation system operation comprising the steps of:

providing a controller combining elements of fuzzy logic and neural network, providing a plurality of sensors, acquiring input data on operating of the circulation system from said plurality of sensors, predeterming fuzzy membership functions and interpreting said input data by means of the fuzzy logic according to said predetermined fuzzy membership functions, thereby obtaining fuzzifier outputs, and providing a main processor and processing said fuzzifier outputs by means of the main processor, thereby obtaining processor outputs indicative of appropriate instructions for the circulation system, and thereby limiting the problem of streaming electrification and operating the circulation system in regimes minimizing the thermal degradation of the electrical insulation of the power apparatus.

15. The method of claim 14, further including the step of designating a plurality of input level designations, such that each one of said fuzzy membership functions corresponds to a respective one of said level designations.

16. The method of claim 14, further including the step of breaking up the analog inputs for a single node into a plurality of output nodes, said step being performed by means of the fuzzy logic.

17. The method of claim 15, further including the step of minor modification in operating conditions of the circulating system by changing said level designations.

18. The method of claim 15, further including the step of implementing the fuzzy logic with a pseudo-neural network configuration.

19. The method of claim 15, further including an assignment of fuzzy memberships to said analog inputs in five fuzzy regions of operating parameter regimes, such as: very low, low, medium, high and very high.

20. The method of claim 14, further including the step of implementation the main processor with a neural network, said neural network of the main processor having an input layer receiving said fuzzifier outputs, a number of said fuzzifier outputs being five times the number of said analog inputs, at least a first hidden layer and an output layer.

21. The method of claim 20, wherein the neural network of the main processor includes a fully connected feed-forward neural network.

22. The method of claim 20, wherein the number of nodes in the output layer of the main processor neural network includes four nodes and corresponds to processor outputs indicating appropriate instructions for the circulation system.

23. The method of claim 14, wherein the main processor outputs include control outputs and alarm outputs, wherein said control outputs request for more cooling or for less cooling, wherein said alarm outputs indicate an instrumentation failure or the streaming electrification danger.

24. The method of claim 14, further including the step of providing a pump operator for interpreting the control outputs from the main processor into a relay operation of said at least one pump.

25. The method of claim 14, wherein the circulation system further includes a plurality of said pumps, further includes the step of specifying a time-delay for said plurality of pumps to allow a contribution of said at least one pump to stabilize before another of said plurality of said pumps is permitted to be energized.

26. The method of claim 17, further including the step of providing said pump operator with two alarms, one alarm for signaling an over-temperature condition, another alarm for signaling a malfunction of the controller or unexpected operating regime.

27. The method of claim 14, wherein the circulation system is a large power transformer cooling system.

28. The method of mitigating the effects of "streaming electrification" in a large power transformer having a cooling system provided with a liquid coolant circulating through the transformer and through a heat exchanger disposed externally of the transformer, and wherein an electrostatic charge builds up in the circulating coolant causing a problem of "streaming electrification" resulting in possible destruction of the transformer, comprising the studs of providing an intelligent controller including a neural network and further including fuzzy logic elements for on-line monitoring of the cooling system, acquiring input data on operation of the circulation system, predetermining fuzzy membership functions and interpring the input data by means of the fuzzy logic according to the predetermined fuzzy membership functions, thereby obtaining fuzzifier outputs, and providing a main processor add processing the fuzzifier outputs by means of the main processor, thereby obtaining processor outputs indicative of appropriate instructions for the circulation system, thereby mitigating the effects of streaming electrification in the large power transformer.

* * * * *

UNITED STATES PATENT AND TRADEMARK OFFICE
CERTIFICATE OF CORRECTION

PATENT NO. : 5,838,881
DATED : November 17, 1998
INVENTOR(S) : Nelson et al

It is certified that error appears in the above-identified patent and that said Letters Patent is hereby corrected as shown below:

Claim 1, column 11, line 61, "plurility" should read -- plurality -- .

Claim 14, column 13, line 56, "predeterming" should read -- predetermining -- .

Claim 28, column 14, line 62, "studs" should read -- steps -- .

Claim 28, column 15, lines 1-2, "interpring" should read -- interpreting -- .

Claim 28, column 15, line 5, "add" should read -- and -- .

Signed and Sealed this

Third Day of August, 1999

Attest:

Q. TODD DICKINSON

*Attesting Officer*  *Acting Commissioner of Patents and Trademarks*